US010208875B1

(12) United States Patent
Zitting

(10) Patent No.: US 10,208,875 B1
(45) Date of Patent: Feb. 19, 2019

(54) QUICK-CONNECT DIELECTRIC UNION

(71) Applicant: Leroy S Zitting, Cottonwood Heights, UT (US)

(72) Inventor: Leroy S Zitting, Cottonwood Heights, UT (US)

( * ) Notice: Subject to any disclaimer, the term of this patent is extended or adjusted under 35 U.S.C. 154(b) by 246 days.

(21) Appl. No.: 15/054,432

(22) Filed: Feb. 26, 2016

(51) Int. Cl.
*F16L 25/02* (2006.01)
*F16L 19/025* (2006.01)
*F16L 19/02* (2006.01)

(52) U.S. Cl.
CPC .......... *F16L 25/023* (2013.01); *F16L 19/025* (2013.01); *F16L 19/0212* (2013.01)

(58) Field of Classification Search
CPC ............. F16L 19/0212; F16L 19/0218; F16L 19/0243; F16L 19/025; F16L 25/023
USPC ........................................ 285/354, 387, 388
See application file for complete search history.

(56) References Cited

U.S. PATENT DOCUMENTS

| | | | | |
|---|---|---|---|---|
| 2,424,727 A * | 7/1947 | Wenk | ................... | F16L 19/048 285/348 |
| 2,867,463 A * | 1/1959 | Snider | ................. | F16L 19/0218 285/336 |
| 3,115,354 A * | 12/1963 | Bowan | .................. | F16L 25/023 285/52 |
| 3,346,274 A * | 10/1967 | Baron | .................. | F16L 25/023 285/354 |
| 3,408,093 A * | 10/1968 | Epstein | ............... | F16L 19/0218 285/347 |
| 3,517,950 A * | 6/1970 | Anderson | ........... | F16L 19/0218 285/52 |
| 3,764,169 A * | 10/1973 | St. Clair | ............. | F16L 19/0218 285/354 |
| 3,799,584 A * | 3/1974 | Slocum | .................. | F16L 19/065 285/354 |
| 3,861,719 A * | 1/1975 | Hand | ..................... | F16L 47/005 285/354 |
| 4,000,919 A * | 1/1977 | Edwards | ............... | F16L 37/091 285/111 |
| 4,595,218 A * | 6/1986 | Carr | ........................ | F16L 25/02 285/354 |
| 4,848,804 A * | 7/1989 | Weigl | .................... | F16L 25/023 285/354 |

(Continued)

OTHER PUBLICATIONS

Annotated photograph of water union.
Photograph from world wide web of fitting from China.

*Primary Examiner* — David Bochna
(74) *Attorney, Agent, or Firm* — Brian C. Trask

(57) ABSTRACT

A quick-connect plumbing device for exemplary use in connection of an appliance, such as a water heater, to supply line of a dwelling, among other uses. Preferably, the connection creates a dielectric coupling between the appliance and supply line to disconnect electrical communication between the supply line and appliance. The device typically includes a length of rigid conduit structured to form a sweat solder connection to a cooperating solderable plumbing element at a first end, and to form a threaded connection to a cooperating threaded plumbing element at an opposite second end, with a resilient seal element being carried at the second end. The threaded connection can be formed by an internally-threaded nut axially affixed to the conduit to permit nut rotation to axially compress the seal element between the conduit and the threaded plumbing element.

10 Claims, 1 Drawing Sheet

(56) References Cited

U.S. PATENT DOCUMENTS

| | | | | |
|---|---|---|---|---|
| 4,877,270 | A * | 10/1989 | Phillips | F16L 49/06 |
| | | | | 285/354 |
| 5,145,219 | A * | 9/1992 | Babuder | F16L 19/0212 |
| | | | | 285/353 |
| 5,169,180 | A * | 12/1992 | Villoni | F16L 25/023 |
| | | | | 285/354 |
| 5,169,182 | A * | 12/1992 | Hashimoto | F16L 41/03 |
| | | | | 285/353 |
| 5,306,052 | A * | 4/1994 | MeGushion | F16L 19/0212 |
| | | | | 285/354 |
| 5,402,829 | A * | 4/1995 | Takikawa | F16L 19/0286 |
| | | | | 285/332.2 |
| 5,490,680 | A * | 2/1996 | Patel | F16L 19/0218 |
| | | | | 285/379 |
| 5,655,797 | A * | 8/1997 | Edstrom, Sr. | F16L 19/12 |
| | | | | 285/354 |
| 5,775,743 | A * | 7/1998 | Rochelle | F16L 19/0218 |
| | | | | 285/354 |
| 2009/0146418 | A1 * | 6/2009 | Noto | F16L 19/025 |
| | | | | 285/133.21 |
| 2011/0115220 | A1 * | 5/2011 | Kuo | F16L 19/025 |
| | | | | 285/353 |
| 2011/0121566 | A1 * | 5/2011 | Cowell | F16L 19/0218 |
| | | | | 285/354 |
| 2012/0223521 | A1 * | 9/2012 | Kotz | F16L 19/0218 |
| | | | | 285/335 |
| 2013/0313824 | A1 * | 11/2013 | Bailey | F16L 19/0218 |
| | | | | 285/379 |
| 2014/0232104 | A1 * | 8/2014 | Bernardi | F16L 25/023 |
| | | | | 285/48 |
| 2017/0350357 | A1 * | 12/2017 | Touchette | F16L 19/0225 |

* cited by examiner

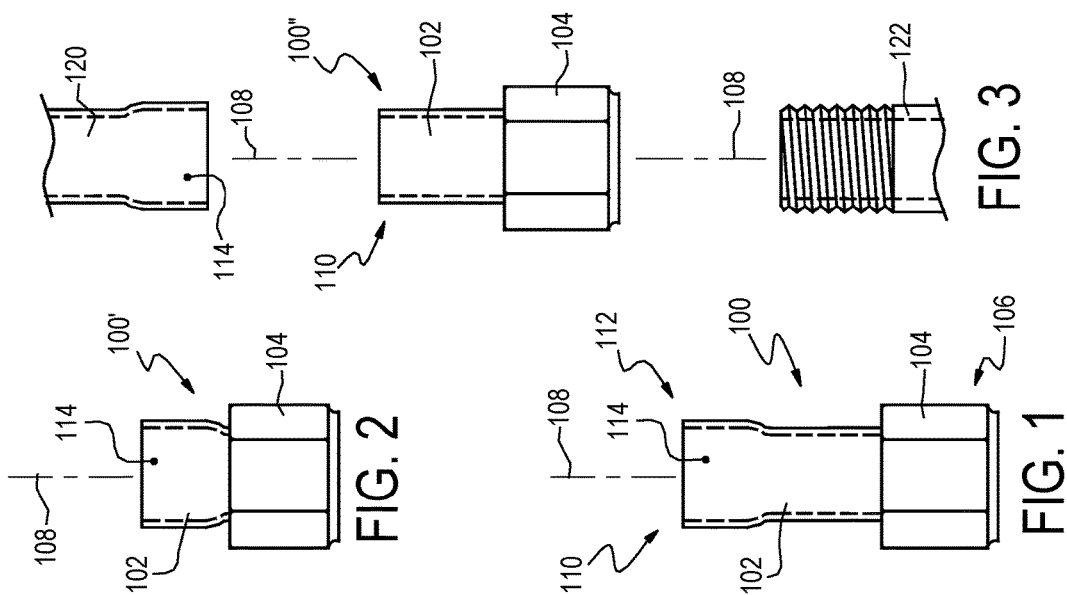

QUICK-CONNECT DIELECTRIC UNION

BACKGROUND

Field of the Invention

This invention relates to coupling devices and plumbing fixtures. It is particularly directed to a quick-connect dielectric union.

State of the Art

Various unions between lengths of conduits in plumbing arrangements are known, including solder joints and threaded connections. A common use of such structures is for coupling a water supply line to an appliance, such as a water heater. Conventionally, a water heater includes a pipe nipple interface. A threaded pipe adapter is applied to the nipple, to convert the nipple's tapered pipe threads to straight threads. The adapter provides straight threads having a larger diameter than the nipple, which permits a brass sweat insert to be simply structured from a cylinder of brass material. A straight bore is made in the insert, sized to receive a water supply line for making a sweat solder joint. A larger diameter flange is machined at an end of the insert to be captured by a union nut. Threads of the union nut are engaged on the straight threads of the adapter, and the nut is tightened to trap the flange between a sealing gasket or washer and an isolation sleeve. The sealing gasket is simultaneously pressed against the adapter to form a fluid leak-resistant connection between the sweat insert and the nipple. Of course, the supply line is connected to the sweat insert by the aforementioned solder joint. A draw-back of this arrangement is that the pipe thread connection between adapter and nipple is a common source of water leaks, quick corrosion, and water flow blockage by water corrosion buildup.

A coupling structure commonly called a water flex has been developed to facilitate connection of a water supply line and the tapered threads of a water heater pipe nipple. A water flex has a union nut structured for galvanic isolation of a length of flexible conduit that is typically about, or in excess of about, a foot between ends. The union nut is structured to directly couple with the pipe nipple of a water heater. The conduit is flexible to permit easily making changes in the shape of the conduit to dispose the supply line-end at a plurality of different positions for convenience of connection to an end of the water supply line. The flexible conduit section is structured specifically to permit hand-bending to deform the conduit without kinking. A draw-back of the water flex is that the conduit tends to be less robust and secure against leaks than is desired. Also, copper flex pipe does easily kink and/or cause water flow blockage where turns are made. This takes great skill and precision to avoid the slightest kink. Once a kink is accidentally made, then the kink cannot be reversed. Also the copper material is very thin, which can easily be damaged during shipping, or even just carrying around on work vehicle or tool or fitting container.

An internet search conducted when preparing this document discovered a fitting that is believed to be available in China, and that is used in connecting refrigerant lines. This fitting has a short rigid length of copper tubing with a socket formed at one end (presumably for a sweat solder joint), and an enlarged folded-over flange disposed to capture a union nut at the other. The folded end appears to be structured to form a bearing surface to butt against a sealing washer in contact with the external surface of the conduit (which surface has been folded inwardly to be orthogonal to the conduit centerline). It is unknown just how long this product has been available, or what type of threads are disposed in the nut. There does not appear to be any provision for galvanic isolation.

It would be an improvement to provide a union that includes both a solder joint and a threaded connection at opposite ends of a rigid conduit in a convenient quick-connect format that can also form a dielectric interruption at the end of a water supply line.

BRIEF SUMMARY OF THE INVENTION

This invention provides an apparatus that can be used for connecting a water supply line to an appliance. One embodiment includes a rigid conduit extending in a length direction between a first end and a second end, an interference structure carried at the first end, the second end being configured to form a sweat solder connection with a first cooperating plumbing element (such as the aforementioned water supply line). An internally threaded nut with a constricting aperture formed by an encircling lip is pierced by the conduit to engage the interference structure in contact with the lip, and thereby, resist axial separation of the nut from the conduit. The nut is free to rotate about the conduit for purpose of thread engagement and release with respect to a second cooperating plumbing element, (such as the aforementioned appliance). A resilient seal element is disposed inside the nut operably to form a fluid leak-resistant seal at the first end of the conduit upon coupling of the nut to the second plumbing element. Typically, the seal element is structured and arranged to form a primary fluid leak-resistant seal by way of axial compression contact between the first end of the conduit and the second plumbing element. Sometimes, the seal element is structured and arranged in harmony with the nut to form a secondary fluid leak-resistant seal by way of axial compression contact between the lip and the seal. In a preferred embodiment, the nut is formed from brass, and the conduit is formed from copper.

An embodiment includes a length of tubing having one end structured to form a sweat solder connection, the opposite second end being structured to form a stop element. An internally threaded nut is disposed in captured axial engagement at the second end of the tubing by the stop element such that the nut may be rotated about a centerline of the tubing for purpose of thread engagement and release with respect to a cooperating threaded plumbing element. A resilient seal element is disposed inside the nut operably to form a fluid leak-resistant seal between the tubing and the threaded plumbing element. Preferably, the tubing is copper; and the nut is brass. Also, it is preferred that the threaded connection is structured to form a dielectric union between the conduit and the threaded plumbing element. Typically, the tubing is rigid, and has a length between about 1 inch and about 12 inches. An operable nut may carry FIP threads, or straight female threads. Sometimes, one end of the device is structured and arranged to form a socket inside of which to receive a cooperating tubing end for forming a sweat solder joint. Other times, one end provides a straight tubing end for reception inside of a cooperating socket of a sweat solder joint. A workable stop element may be formed as a flared end portion of the tubing. A seal element may be structured and arranged for compression between the flared end portion of the tubing and the threaded plumbing element.

An embodiment may form a quick-connect plumbing device, including a length of rigid conduit structured to form a sweat solder connection to a cooperating solderable plumbing element at a first end, and to form a threaded connection to a cooperating threaded plumbing element at an opposite second end. A resilient seal element is carried at the second end. The threaded connection includes an internally-threaded nut axially affixed to the conduit to permit nut rotation to axially compress the seal element between the conduit and the threaded plumbing element. Desirably, the threaded connection is structured to form a dielectric coupling between the conduit and the threaded plumbing element. The nut may carry female pipe threads, or female straight threads. In a preferred embodiment, the nut is axially retained in association with the conduit by way of a flared end of the conduit.

BRIEF DESCRIPTION OF THE DRAWINGS

In the drawings, which illustrate what are currently considered to be the best modes for carrying out the invention:
FIG. 1 is a side view in elevation of a first embodiment;
FIG. 2 is a side view in elevation of a second embodiment;
FIG. 3 is an exploded side assembly view of a third embodiment with cooperating plumbing elements;
FIG. 4 is a partial cross-section view in elevation of the embodiment similar to that of FIG. 1, but further including a dielectric element, and installed on a cooperating plumbing element; and
FIG. 5 is an exploded view of the embodiment in FIG. 4.

DETAILED DESCRIPTION OF THE ILLUSTRATED EMBODIMENTS

Reference will now be made to the drawings in which the various elements of the illustrated embodiments will be given numerical designations and in which the invention will be discussed so as to enable one skilled in the art to make and use the invention. It is to be understood that the following description is only exemplary of certain principles of the present invention, and should not be viewed as narrowing the claims which follow.

A first embodiment of a union according to certain principles of the invention is indicated generally at 100 in FIG. 1. Union 100 includes a length of rigid conduit 102 and an internally-threaded nut 104. Nut 104 is affixed to a first end, generally 106, of rigid conduit 102 to resist axial separation of the nut 104 from the conduit 102 while permitting rotation of the nut 104 about a conduit centerline 108. Copper conduit is currently preferred, although conduit made from Stainless Steel, Steel, cast iron, Aluminum, combinations of metals and alloys, cast iron, brass, bronze, and the like, can also work.

A union according to certain principles of the invention, such as union 100, includes structure to form a sweat solder connection, generally 110, carried at the opposite second end, generally 112, of rigid conduit 102. In FIG. 1, solder connection structure 110 includes a socket 114, inside of which to receive a cooperating end of tubing to make a sweat solder joint. A workable socket 114 may be swaged into the conduit 102, or otherwise affixed to the conduit 102.

The alternative embodiment indicated generally at 100' in FIG. 2 is substantially the same as embodiment 100, except that the length of rigid conduit 102 is generally minimized. The device 100' is adapted for use in tight spaces, where a longer embodiment 100 would not easily be installed. A rigid conduit 102 may typically range in length between about 1 inch and about 12 inches, although longer conduits are also workable. A currently preferred length for the union assembly is about 3¼ inches. A length of a workable union may also be 3 inches, 5 inches, 6 inches, 8 inches, and the like. Unions according to certain principles of the invention and having lengths shorter than about 6 inches are regarded as extremely difficult to bend, and certainly not bendable by hand. The minimum length of a rigid conduit for a union according to the invention is that length that is sufficient to capture a nut 104 at one end, and to form a sweat solder connection at the other end.

FIG. 3 illustrates a third embodiment 100" in position to be installed onto a first plumbing element 120 and a second plumbing element 122. The plumbing elements 120 and 122 can be any useful size and conformation. Illustrated plumbing element 120 includes an end of tubing that carries a socket 114 in which to receive cooperating sweat solder structure 110 of conduit 102. After the solder joint is made, nut 104 can be rotated about centerline 108 to engage or release the threaded end of element 122. Full engagement of nut 104 and element 122 is operable to form a fluid leak-resistant connection between rigid conduit 102 (and essentially element 120) and element 122. An exemplary plumbing element 120 is a water supply line, and an exemplary plumbing element 122 is a pipe nipple.

With reference now to FIG. 4, certain embodiments include a length L of conduit 102 that permits axial motion of the nut 104. Sometimes, such motion is helpful to position an end of plumbing element 120 closely to an end of plumbing element 122, and thereby, to conveniently locate a nut 104 for its proper engagement with the end of the plumbing element 122.

It is worth noting that conduit 102 forming a union according to certain principles of the invention is characterized as rigid. That is, while a conduit 102 may sometimes be deformed somewhat to a non-straight shape, the conduit 102 is not specifically structured to facilitate such deformation by a hand operation. A bending tool or form is generally required to impart a significant deflection to a conduit 102 to avoid causing a kink. In contrast, commercially available water flexes include a conduit body that is corrugated or undulating to facilitate bending the body by hand, and to significant degree, without permitting formation of a kink. A water flex can even sometimes be formed into a coil, or partial coil.

As also shown in FIG. 4, it is preferred to include an isolating washer 123 to electrically isolate the nut 104 from the plumbing element 120. However, it should be noted that washer 123 is not required. When washer 123 is included in a close union 100', it is generally preferred for the washer's axial extension to be sized in agreement with the length of the passage through the nut 104 to maximize distance from a solder joint at the opposite end of the union. In other embodiments, the washer 123 may extend axially by any convenient amount.

As best illustrated in FIG. 4, full engagement of nut 104 and element 122 is effective to compress seal 128 between the conduit 102 and plumbing element 122. This compression forms a primary fluid leak-resistant seal between element 120 and element 122. Another primary fluid leak-resistant seal is formed at the solder connection at the opposite end of exemplary union 100. Sometime, a secondary seal may be formed by compression of the seal 128 against the nut 104. Also, another secondary seal may be formed between the threads of nut 102 and cooperating threads of plumbing element 122.

With reference now to FIG. 5, the first end 106 of conduit 102 carries an interference structure 130. (Note that conduit 102 is illustrated displaced out-of-position for clarity of illustration of the various elements). The diameter of conduit 102 (and washer 123, when present), is slidingly received in constricting aperture 132, and interference structure 130 resists axial separation of nut 104 from engagement with conduit 102. Constricting aperture 132 is formed by encircling lip 136, and is pierced by conduit 102. Consequently, interference structure 130 (or the rim of a washer 123, in the illustrated embodiment), may make contact with lip 136. That is, surface 138 may be captured by engagement against surface 140 to maintain nut 104 in association with conduit 102. If washer 123 is not present, surface 138 is the corresponding axially-oriented surface of flange 130. In any case, nut 104 is free to rotate about conduit centerline 108.

The diameter of aperture 132 is one distinguishing element that can differentiate embodiments according to the instant invention over a conventional water union. Embodiments according to the invention have an aperture 132 that is too small to receive the brass sweat fitting and isolation sleeve of a conventional water union. (The diameter of aperture 132 is, however, also typically sized to accommodate a washer 123 for galvanic isolation). In contrast, the conventional water union has a brass sweat insert that fits over the water supply conduit, and accordingly, provides an additional thickness of material that must be received in a corresponding aperture of the union nut.

With continued reference to FIG. 5, installation of nut 104 onto plumbing element 122 causes circumferentially-disposed axial seal 128 to be compressed between conduit 102 and element 122. Surface 142 is pressed into axial engagement with surface 144. Similarly, surface 146 is pressed into axial engagement with surface 148. Consequently, the compressed seal 128 forms a primary fluid leak-resistant seal.

A workable interference structure 130 includes any sort of a flange or increased diameter blocking element structured in harmony with aperture 132 and that can axially retain a nut 104 in association with a conduit 102. It is currently preferred to form interference structure 130 by flaring the end of the conduit 102, as illustrated, to form a unitary and radially expanding flange that terminates at a maximum diameter. A preferred flared flange 130 is structured to cause contact between an expanded inside surface of conduit 102 and seal element 128. However, it is within contemplation to alternatively affix a blocking element to the conduit 102 to create an equivalent resulting structure 130. For non-limiting examples, such an alternative blocking element may be soldered or threaded onto the end of a conduit 102.

It is desirable for a resilient seal 128 to be high-temperature tolerant. One workable seal includes a Watts model #HCWBA water heater connector washer.

A workable nut 104 includes internal threads 150 and a suitably-sized aperture 132. While it is currently preferred for a nut 104 to be brass, other materials, including Aluminum, bronze, Stainless Steel, Galvanized Steel, cast iron, alloys of different elements, and the like, are workable. Workable threads 150 include straight threads, and (somewhat surprisingly) pipe threads. Conventionally, compression of a washer to form a leak-resistant seal would indicate use of straight threads to ensure complete washer compression before achieving thread lock-up. Workable nuts 104 having straight threads are available, e.g., in assemblies of certain plumbing connectors, but seemingly not as stand-alone, off-the-shelf items.

While the invention has been described in particular with reference to certain illustrated embodiments, such is not intended to limit the scope of the invention. The present invention may be embodied in other specific forms without departing from its spirit or essential characteristics. The described embodiments are to be considered as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
   a rigid conduit extending in a length direction between a first end and a second end, an interference structure carried at said first end, said second end being configured to form a sweat solder connection with a first cooperating plumbing element;
   an electrically insulating isolation sleeve carried on said conduit between said interference structure and said second end;
   a nut with an internally disposed female tapered pipe thread and a constricting aperture comprising an encircling lip pierced by said conduit and said isolation sleeve to engage said isolation sleeve in contact with said encircling lip and thereby resist axial separation of said nut from said conduit in a direction away from said second end and toward said first end, said nut being free to rotate about said conduit for purpose of thread engagement and release of said female tapered pipe thread with respect to a male tapered pipe thread of a cooperating pipe nipple;
   said cooperating pipe nipple consisting of a length of pipe with tapered pipe threads disposed at each end of the pipe, one end of said cooperating pipe nipple being threadedly coupled to the nut; and
   a resilient seal element disposed inside said nut to form a fluid leak-resistant seal at the first end of said conduit upon coupling of said nut to said cooperating pipe nipple, the leak-resistant seal comprising compression of the seal element between a proximal end of said cooperating pipe nipple and said interference structure, wherein:
   said second end comprises a swaged and thereby expanded socket inside of which to receive a cooperating tubing end for forming a sweat solder joint.

2. The apparatus according to claim 1, wherein:
   the conduit is copper and has a length extending in an axial direction of between about 2 inches and about 12 inches; and
   the nut is brass.

3. The apparatus according to claim 1, wherein:
   the conduit is rigid to resist bending by hand.

4. The apparatus according to claim 1, wherein:
   the conduit has a length between about 1 inch and about 12 inches.

5. The apparatus according to claim 1, wherein:
   the interference structure is formed as a flared end portion of the conduit.

6. The apparatus according to claim 5, wherein:
   the seal element and conduit end are structured and arranged for compression of the seal element, against the effective internal surface of the conduit, between the flared end portion of the conduit and the threaded pipe nipple.

7. The device according to claim 1, wherein:
   the nut is axially retained in association with the conduit by way of a flared end of the conduit, the flared end of the conduit being configured such that the effective internal surface of the conduit is arranged to compress the seal element against the pipe nipple upon installation of the plumbing device onto the pipe nipple.

8. An apparatus, comprising:
a rigid conduit extending in a length direction between a first end and a second end, an interference structure carried at said first end, said second end being configured to form a sweat solder connection with a first cooperating plumbing element;
an electrically insulating isolation sleeve carried on said conduit between said interference structure and said second end;
a nut with internally disposed female tapered pipe threads and a constricting aperture comprising an encircling lip pierced by said conduit and said isolation sleeve to engage said isolation sleeve in contact with said encircling lip and thereby resist axial separation of said nut from said conduit in a direction away from said second end and toward said first end, said nut being free to rotate about said conduit for purpose of thread engagement and release of said female tapered pipe threads with respect to male tapered pipe threads disposed at an end of a cooperating pipe nipple; and
a resilient seal element disposed inside said nut to form a fluid leak-resistant seal at the first end of said conduit upon coupling of said nut to said pipe nipple, wherein:
the interference structure is created by flaring the first end of the conduit to form a unitary and radially expanding flange that terminates at a maximum diameter to dispose an expanded inside surface of the conduit for axially-oriented contact against the seal element; and
said seal element is structured and arranged to form a primary fluid leak-resistant comprising axial compression contact of the seal element against the expanded inside surface of said conduit, the seal element also forming a redundant secondary seal by contacting a radially-oriented outer surface of the isolation sleeve, the primary and secondary leak-resistant seals being respectively disposed upstream and downstream in the same fluid leak path.

9. The apparatus according to claim 8, wherein:
said seal element is structured and arranged in harmony with said nut to form a further supplemental fluid leak-resistant seal by way of axial compression contact between said lip and said seal.

10. The apparatus according to claim 8, wherein:
said nut is formed from brass; and
said conduit is formed from copper.

* * * * *